June 20, 1961  S. J. LEONE  2,989,189
HOLDER FOR CARDS OR PLATES AND METHOD OF MAKING IT
Filed Dec. 14, 1959
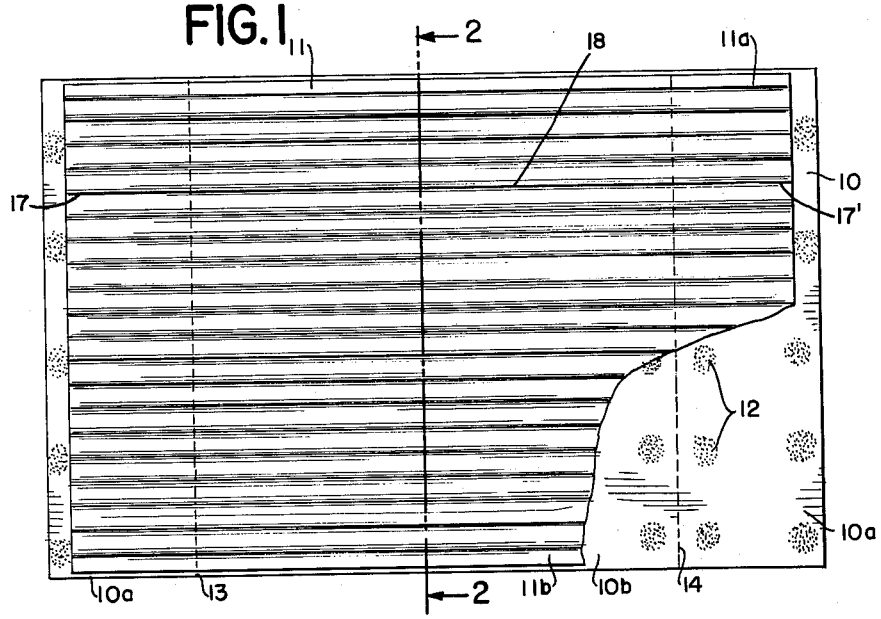
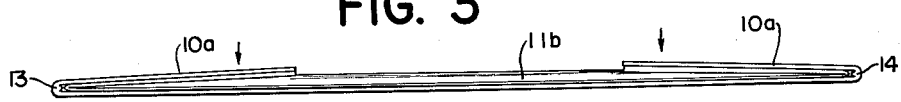
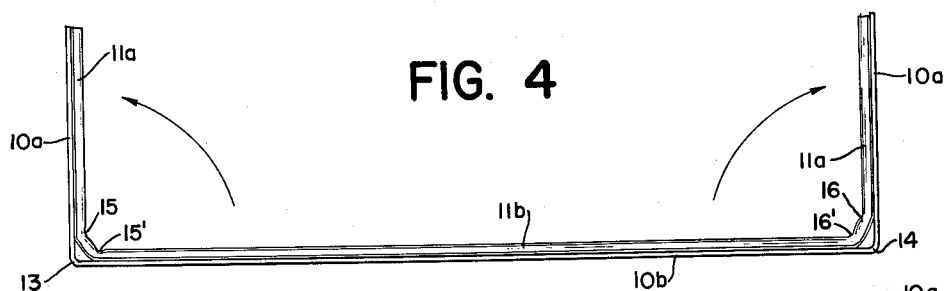
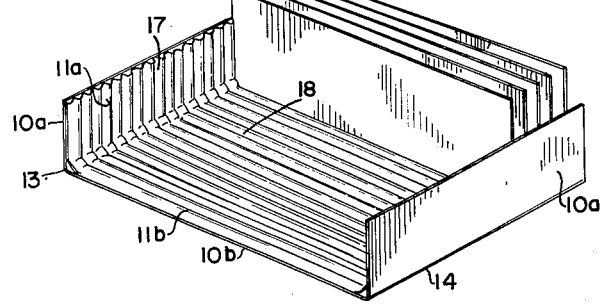
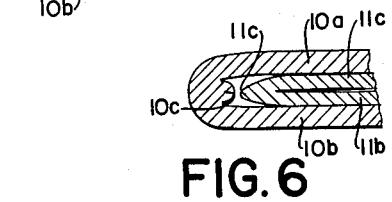
INVENTOR
Salvatore J. Leone
BY
Pennie Edmunds Morton Barrows Taylor
ATTORNEYS

United States Patent Office 2,989,189
Patented June 20, 1961

2,989,189
HOLDER FOR CARDS OR PLATES AND METHOD OF MAKING IT
Salvatore J. Leone, Wallingford, Conn., assignor to The New Haven Board and Carton Company, New Haven, Conn., a corporation of Connecticut
Filed Dec. 14, 1959, Ser. No. 859,503
3 Claims. (Cl. 211—41)

This invention relates to holders for a plurality of flat articles, such as plates or cards, standing on edge and face to face. More particularly, the invention is concerned with a novel holder for the purpose stated and a method, by which the holder can be advantageously produced. The new holder is light in weight, can be made inexpensively of paper stock, is foldable so that it can be shipped flat, and can be quickly erected to operative condition. The holder can be made to receive a wide range of numbers and sizes of flat articles and it holds the articles securely in upright position. The articles can be removed one at a time from the holder without disturbing the remainder and the outer faces of the end articles in the holder are substantially completely exposed. The holder may, accordingly, be used to especial advantage on counters and shelves in retail stores for the display of articles of merchandise mounted on cards.

For a better understanding of the invention, reference may be made to the accompanying drawing, in which FIG. 1 is a top plan view of the new holder with part of the liner broken away;

FIG. 2 is a sectional view on the line 2—2 of FIG. 1 with the liner and base separated;

FIG. 3 is a side elevational view of the holder in collapsed condition;

FIG. 4 is a side elevational view of the erected holder;

FIG. 5 is a perspective view of the holder in use for holding oblong plates; and FIG. 6 is a partial longitudinal sectional view on an enlarged scale through one fold of the holder.

The new holder in the form shown in FIG. 1 comprises a base 10 and a liner 11 adhesively secured to the upper face of the base. The base is made of a suitable sheet material which is foldable, and is preferably made of a light weight paperboard. The liner is of corrugated sheet material and may be formed of relatively stiff paper.

The dimensions of the base and liner depend on the dimensions of the cards or plates to be held. In the holder shown, the base is oblong in shape and the holder is also oblong but slightly shorter than the base.

In assembling the base and liner in accordance with the method to form the holder, adhesive is applied to the upper face of the base and may be placed on spaced areas 12 arranged in transverse rows or in lines extending across the base. Since the liner is not to be secured to the base adjacent to the transverse fold lines, adhesive preferably is not applied to the base along those lines. Also, it is undesirable to coat the entire upper surface of the base since complete adhesion of the liner to the base throughout their contacting areas is not necessary and is wasteful of adhesive. The adhesive may be applied in a gluing machine and, after its application and before the adhesive has set, the liner is placed on the surface of the paper and centered between the ends thereof. The base with the liner in place is then advanced to folding means, by which the base is folded on lines 13 and 14 extending transverse to the corrugations of the liner and spaced inwardly from the ends of the liner. In the folding operations, the end sections 10a of the base and 11a of the liner lying outwardly from the fold lines are turned inward to overlie the central sections 10b of the base and 11b of the liner as shown in FIG. 3. The inturned end sections of the base and liner are held in place against the central section of the liner until the adhesive has hardened.

In the folding operation, the material of the base tends to form an inward bulge 10c in the depth of each fold as shown in FIG. 6, forcing the liner out of contact with the base member for a slight distance immediately adjacent the fold line. The outer surface 11c of the adjacent fold in the liner lies close to or in contact with the surface of the bulge.

When an attempt is made to raise the end sections of the base and liner to erect position, resistance to such movement is encountered because the fold lines 15, 15' and 16, 16' of the liner lie spaced a short distance from the fold lines 13, 14 of the base, so that the end sections of the liner tend to lie in vertical planes spaced inward from the vertical planes of the end sections of the base. The adhesive connection between the end sections of the base and liner necessitate their movement in unison and, as the end sections are moved to the vertical, the material of the liner is stretched and the liner tends to separate from the base at opposite sides of and near each fold line. Because the central section of the liner between the fold lines is slightly shorter than the corresponding central section of the base, the liner may be shorter than the base and, at the same time, its end sections may be sufficiently long to provide a complete lining for the end sections of the base. Upon release of the end sections, they tend to swing downwardly toward the central section.

When the end sections are raised to vertical position to receive cards or plates, the corrugations of the liner form grooves 17 and 17' in the respective end sections which are in alignment with grooves 18 in the central section 10b, which receive the cards or plates.

In forming the holder for specific cards or plates, the holder is made so that the distance between the bottoms of aligned grooves 17 and 17' in the end sections of the liner, when those end sections are erect, is equal to the length of the cards or plates. Accordingly, when a card or plate is inserted in the holder in a pair of aligned grooves in the end sections, the end sections are held erect by the card or holder and the tendency of the end sections to move inward toward the base causes the side edges of the card or plate to be tightly gripped. The height of the end sections employed will depend on the articles to be held with the height increasing with the height of the articles.

It will be apparent that the new holder can be shipped flat with its end sections in contact with the upper surface of the central section of the liner, so that a large number of the holders can be packed in a small container. At the point of use, the holder can be quickly erected by swinging the end sections to the vertical and the end sections remain in that position so long as one or more cards or plates are in place in the holder. As each article is disposed in a single groove in the corrugated liner, an article may be quickly removed by being lifted free of the holder and its removal does not affect the grip of the holder on the remaining articles. When the articles to be placed in the holder are cards carrying items of merchandise, the cards will be placed in grooves in the liner spaced a distance depending upon the size of the items on the cards. When a plurality of such cards are set up on the holder, the outer faces of the end cards are almost completely exposed and the holder can thus be employed for the display of articles in retail stores.

I claim:

1. A holder for cards and plates, which comprises a base of flat sheet material and a liner of corrugated sheet material adhesively affixed to the upper surface of the base and held in face-to-face contact therewith over the major portion thereof, the base and liner being folded along fold lines lying transverse to the corrugations of the liner and inward from the corresponding ends of the base and liner to form end sections of the base and liner overlying the central sections of the base and liner, the outer surfaces of the liner adjacent to the fold lines being spaced from the inner surface of the base adjacent to the fold lines.

2. The holder of claim 1, in which the base is made of heavier stock than the liner.

3. The holder of claim 1, in which the central sections of the base and liner lie in face to face contact throughout the area of the central section of the liner.

References Cited in the file of this patent

UNITED STATES PATENTS

| | | |
|---|---|---|
| 970,491 | Grandperrin | Sept. 20, 1910 |
| 1,907,601 | Snyder | May 9, 1933 |
| 1,965,951 | Williams | July 10, 1934 |
| 2,010,734 | Parker | Aug. 6, 1935 |
| 2,041,880 | Valtat | May 26, 1936 |
| 2,130,445 | Bemiss | Sept. 20, 1958 |
| 2,245,064 | Bemiss | June 10, 1941 |
| 2,582,785 | Luppold | Jan. 15, 1952 |
| 2,717,224 | McConell | Sept. 6, 1955 |
| 2,741,362 | Cortright | Apr. 10, 1956 |
| 2,833,404 | Jacobs | May 6, 1958 |